United States Patent
Funakoshi et al.

(10) Patent No.: US 9,337,696 B2
(45) Date of Patent: May 10, 2016

(54) ROTARY ELECTRIC MACHINE, STATOR UNIT AND WIRE CONNECTION SUBSTRATE

(71) Applicant: KABUSHIKI KAISHA YASKAWA DENKI, Kitakyushu-shi (JP)

(72) Inventors: Kenji Funakoshi, Kitakyushu (JP); Hideyuki Onda, Kitakyushu (JP); Kanta Yamaguchi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 384 days.

(21) Appl. No.: 13/925,834

(22) Filed: Jun. 25, 2013

(65) Prior Publication Data

US 2014/0111037 A1  Apr. 24, 2014

(30) Foreign Application Priority Data

Oct. 19, 2012 (JP) .................... 2012-231591

(51) Int. Cl.
| | |
|---|---|
| *H02K 3/38* | (2006.01) |
| *H02K 3/28* | (2006.01) |
| *H02K 5/08* | (2006.01) |
| *H02K 15/08* | (2006.01) |
| *H02K 3/52* | (2006.01) |

(Continued)

(52) U.S. Cl.
CPC .. *H02K 3/38* (2013.01); *H02K 3/28* (2013.01); *H02K 3/522* (2013.01); *H02K 5/08* (2013.01); *H02K 15/08* (2013.01); *H02K 15/12* (2013.01); *H02K 21/16* (2013.01); *H02K 2203/09* (2013.01); *Y10T 29/49009* (2015.01)

(58) Field of Classification Search
CPC ............ H02K 3/38; H02K 3/28; H02K 3/46; H02K 3/50
USPC .............................................. 310/43, 71, 194
See application file for complete search history.

(56) References Cited

U.S. PATENT DOCUMENTS

| | | | |
|---|---|---|---|
| 2009/0021101 A1 | 1/2009 | Okamoto et al. | |
| 2009/0140595 A1* | 6/2009 | Naganawa ............. | H20K 3/522 310/201 |

(Continued)

FOREIGN PATENT DOCUMENTS

| | | |
|---|---|---|
| CN | 101390272 | 3/2009 |
| CN | 101442230 | 5/2009 |

(Continued)

OTHER PUBLICATIONS

Chinese Office Action for corresponding CN Application No. 201310259470.5, Aug. 28, 2015.

(Continued)

*Primary Examiner* — Michael Andrews
(74) *Attorney, Agent, or Firm* — Mori & Ward, LLP

(57) ABSTRACT

A rotary electric machine includes: a rotating shaft having an axis extending in an axial direction; a rotor fixed to the rotating shaft; a stator provided with a plurality of stator coils; a wire connection part provided at one side of the stator coils in the axial direction, the wire connection part connecting end portions of the stator coils in a specified wire connection pattern; and a resin molded part arranged to cover the wire connection part and the stator coils. The wire connection part includes a plurality of conductive members connected to the end portions of the stator coils and an insulating member arranged to at least partially cover surfaces of the conductive members. The insulating member has projection portions protruding toward the resin molded part existing at the one side of the stator coils in the axial direction.

17 Claims, 8 Drawing Sheets

(51) Int. Cl.
*H02K 15/12* (2006.01)
*H02K 21/16* (2006.01)

(56) References Cited

U.S. PATENT DOCUMENTS

| | | | | |
|---|---|---|---|---|
| 2010/0148615 | A1* | 6/2010 | Sasaki | H02K 3/522 |
| | | | | 310/180 |
| 2013/0069461 | A1* | 3/2013 | Arai | H02K 3/38 |
| | | | | 310/71 |

FOREIGN PATENT DOCUMENTS

| | | |
|---|---|---|
| CN | 101730969 | 6/2010 |
| JP | 08-223845 | 8/1996 |
| JP | 2007-166760 | 6/2007 |
| JP | 2008-301561 | 12/2008 |
| JP | 2009-131025 | 6/2009 |
| JP | 2010-119238 | 5/2010 |
| JP | 2011-254629 | 12/2011 |
| JP | 2011254629 A * 12/2011 | ............... H02K 3/50 |

OTHER PUBLICATIONS

Japanese Office Action for corresponding JP Application No. 2012-231591, Oct. 29, 2014.

Japanese Office Action for corresponding JP Application No. 2012-231591, Mar. 5, 2014.

\* cited by examiner

← COUNTER-LOAD SIDE → LOAD SIDE

ROTARY ELECTRIC MACHINE, STATOR UNIT AND WIRE CONNECTION SUBSTRATE

CROSS-REFERENCE TO RELATED APPLICATION

The present disclosure contains subject matter related to that disclosed in Japanese Priority Patent Application No. 2012-231591 filed on Oct. 19, 2012. The contents of this application are incorporated herein by reference in their entirety.

BACKGROUND OF THE INVENTION

1. Field of the Invention

Embodiments disclosed herein relate to a rotary electric machine, a stator unit and a wire connection substrate.

2. Description of the Related Art

Japanese Patent Application Publication No. H8-223845 (JP8-223845A) discloses a stator for a molded motor, in which the ends of armature coils provided in a stator core are connected to a wire connection part (a wire connection substrate) through lead wires and in which the armature coils and the wire connection part are molded with an insulating resin.

In the stator disclosed in JP8-223845A, however, no particular consideration is taken into the enhancement of a coupling degree of the wire connection part and the resin molded part, and it is difficult to reliably encapsulate the wire connection part by resin molding.

SUMMARY OF THE INVENTION

In accordance with an aspect of the present embodiments, there is provided a rotary electric machine including: a rotating shaft having an axis extending in an axial direction; a rotor fixed to the rotating shaft; a stator provided with a plurality of stator coils, the stator arranged radially opposite to the rotor; a wire connection part provided at one side of the stator coils in the axial direction, the wire connection part connecting end portions of the stator coils in a specified wire connection pattern; and a resin molded part arranged to cover the wire connection part and the stator coils. The wire connection part includes a plurality of conductive members connected to the end portions of the stator coils and an insulating member arranged to at least partially cover surfaces of the conductive members, the insulating member having projection portions protruding toward the resin molded part existing at the one axial side.

In accordance with another aspect of the present embodiments, there is provided a stator unit including: a stator provided with a plurality of stator coils; a wire connection part provided at one side of the stator coils in an axial direction, the wire connection part connecting end portions of the stator coils in a specified wire connection pattern; and a resin molded part arranged to cover the wire connection part and the stator coils. The wire connection part includes a plurality of conductive members connected to the end portions of the stator coils and an insulating member arranged to at least partially cover surfaces of the conductive members, the insulating member having projection portions protruding toward the resin molded part existing at the one axial side.

In accordance with still another aspect of the present embodiments, there is provided a wire connection substrate for connecting the end portions of stator coils of the stator unit, which includes: conductive members connected to the end portions of the stator coils; and insulating member arranged to at least partially cover the surfaces of the conductive members. The insulating member is provided with a resin-fixing projection portion.

In accordance with still another aspect of the present embodiments, there is provided a method of manufacturing a rotary electric machine provided with the wire connection substrate. The method includes: arranging an assembly of the wire connection substrate and a stator of the rotary electric machine within a cavity of a mold such that an axial end surface of each of the projection portions of the wire connection substrate faces a wall surface of an upper mold cover of the mold; and supplying a molding resin into the cavity and solidifying the resin in a state that the axial end surfaces of the projection portions make contact with the wall surface of the upper mold cover.

DESCRIPTION OF THE EMBODIMENTS

Embodiments of a rotary electric machine, a stator unit and a wire connection substrate will now be described in detail with reference to the accompanying drawings.

(Overall Configuration of Rotary Electric Machine)

Figure 1:
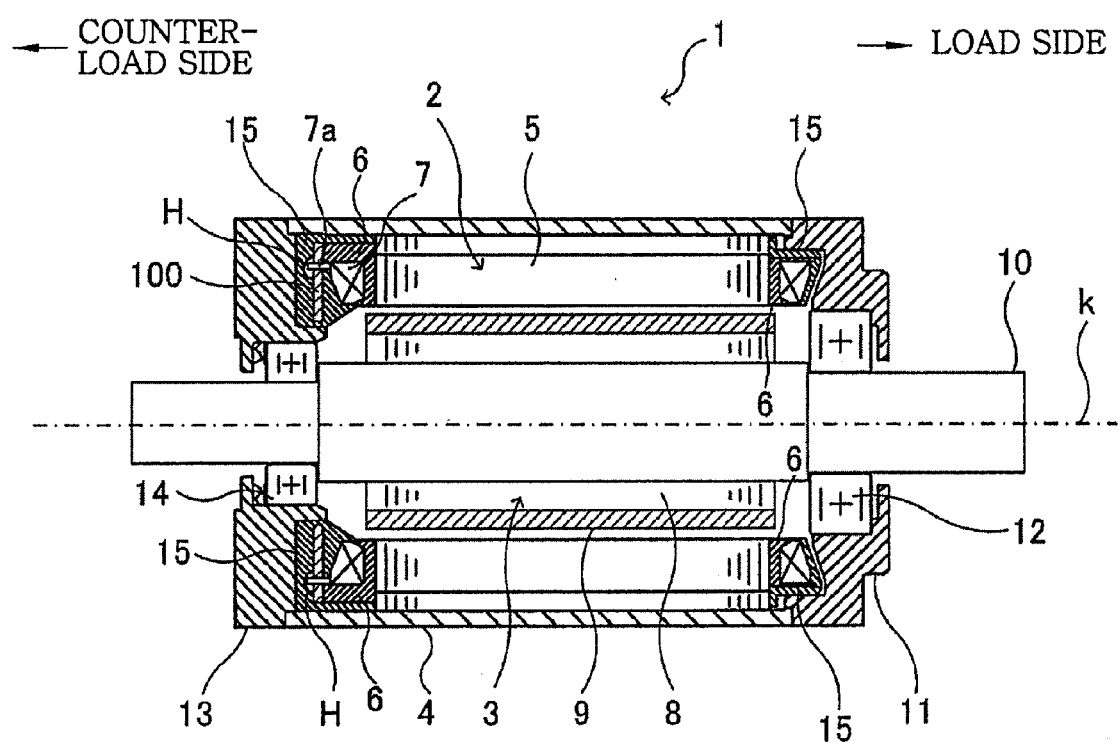
FIG. 1 is a longitudinal section view showing the overall configuration of a rotary electric machine according to one embodiment.

The overall configuration of a rotary electric machine 1 according to the present embodiment will be described with reference to FIGS. 1 and 2. In the example shown in FIGS. 1 and 2, the rotary electric machine 1 is a three-phase AC motor. More specifically, the rotary electric machine 1 includes a stator 2 and a rotor 3. The rotor 3 is fixed to the outer circumferential surface of a rotating shaft 10 having an axis k.

The rotor 3 includes a yoke 8 and a permanent magnet 9. The rotating shaft 10 is rotatably supported by a load-side bearing 12 whose outer race is fitted to a load-side bracket 11 and a counter-load-side bearing 14 whose outer race is fitted to a counter-load-side bracket 13.

The stator 2 is arranged on the inner circumferential surface of a frame 4 opposite to the radial outer surface of the rotor 3. The stator 2 includes a plurality of laminated core bodies 5, a plurality of bobbins 6 into which the laminated core bodies 5 are inserted and a plurality of stator coils 7 wound around the bobbins 6. In the stator 2 of the present embodiment, twelve laminated core bodies 5 and twelve bobbins 6 are substantially annularly arranged and the stator coils 7 are wound on the respective bobbins 6 (see FIG. 2).

The respective bobbins 6 are made of an insulating material such as a resin or the like so as to electrically insulate the laminated core bodies 5 and the stator coils 7. An annular wire connection substrate 100 (corresponding to a wire connection part) is provided at the counter-load side (one axial end side or the left side in FIG. 1) of the bobbins 6. The wire connection substrate 100 serves to connect the coil end portions 7a of the stator coils 7 in a specified wire connection pattern. The coil end portions 7a of the stator coils 7 are integrally covered with a resin molded part 15.

(Wire Connection Substrate)

Figure 2:
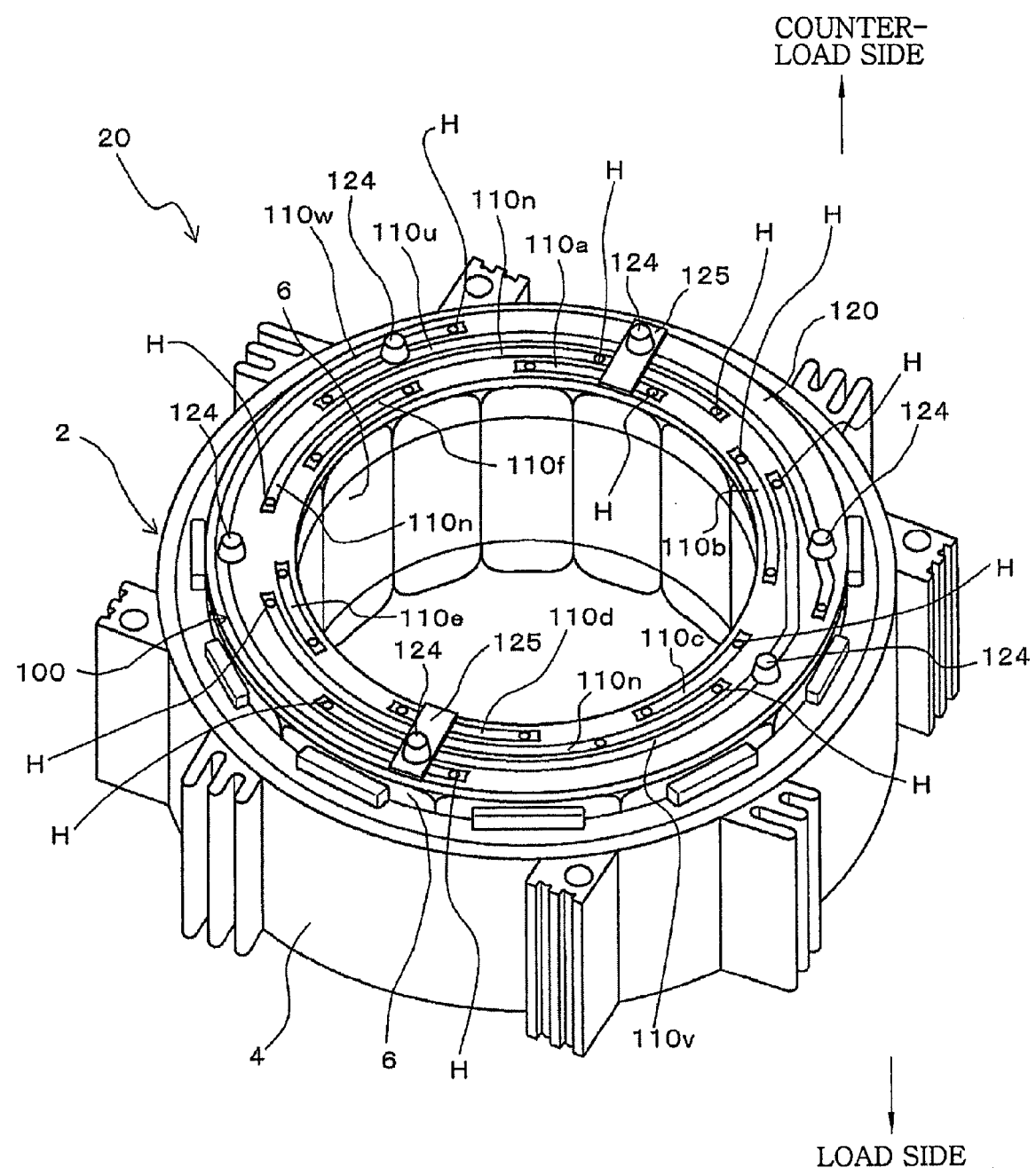
FIG. 2 is a perspective view showing a rotor provided in the rotary electric machine shown in FIG. 1, in which the rotor is seen from the counter-load side with a resin molded part removed for clarity.
Figure 3:
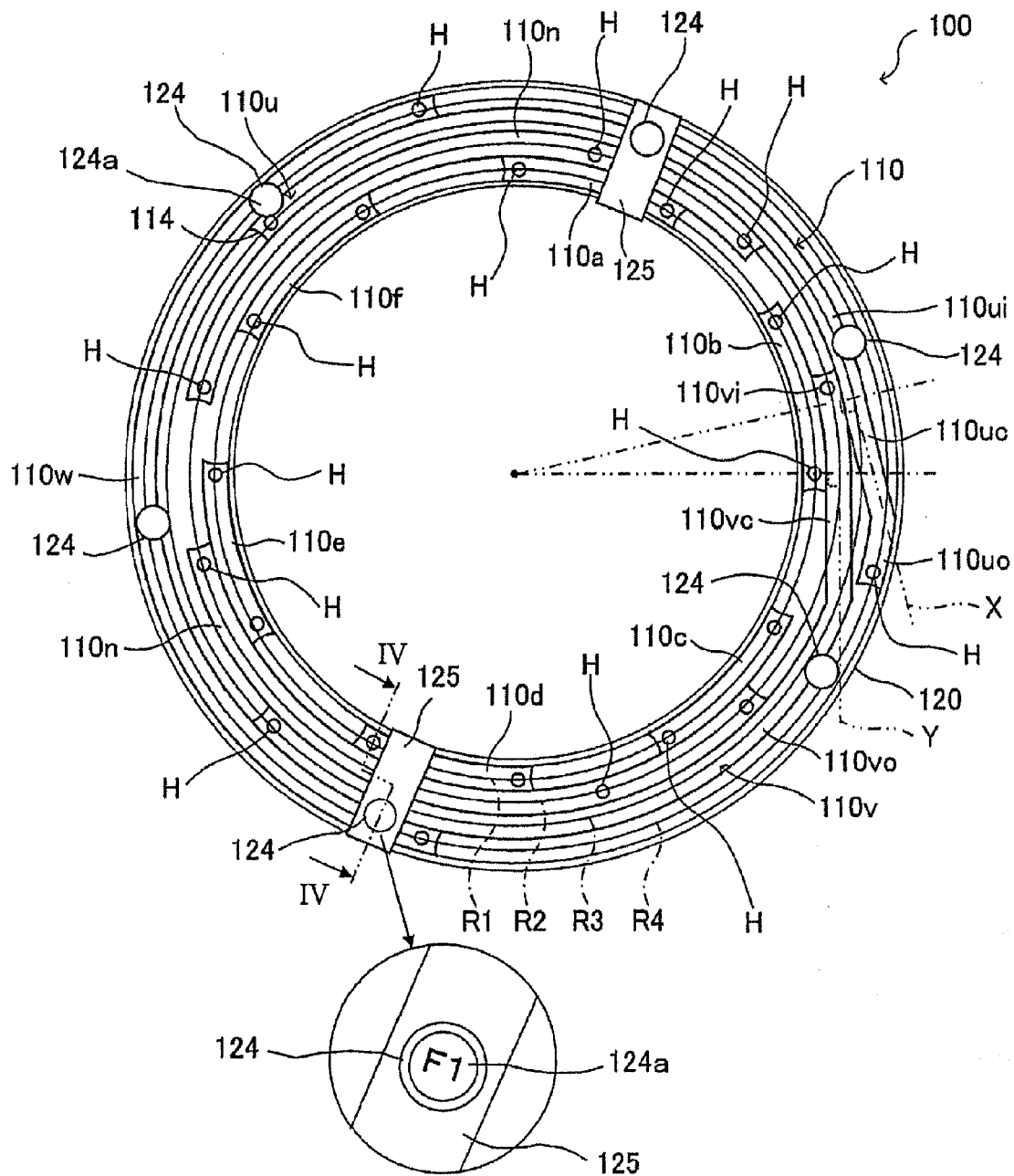
FIG. 3 is a plan view showing the overall configuration of a wire connection substrate provided in the rotary electric machine shown in FIG. 1, in which the wire connection substrate is seen from the counter-load side.

As shown in FIGS. 2 and 3, the wire connection substrate 100 includes a plurality of arc-shaped (or annular) conductive members 110 concentrically arranged and connected to the coil end portions 7a (see FIGS. 1 and 4) of the stator 2 and a substantially annular insulating member 120 arranged to cover at least some portions of the surfaces of the conductive members 110 (The details will be described later).

(Conductive Member)

Referring to FIGS. 2 and 3, the respective conductive members 110 are substantially concentrically arranged in four layers along a radial direction. In the present embodiment, as will be described in detail later, the respective conductive members 110 are formed by shaping, e.g., a single coated flat wire into a spiral shape and then severing and removing, e.g., certain portions of the coated flat wire (see the ends 114 formed by removal). In reality, removal portions are also generated in the insulating member 120 when severing the coated flat wire. For the sake of simplicity, the removal portions of the insulating member 120 are not shown in FIGS. 2 and 3.

Six conductive members 110a to 110f arranged at the innermost side are conductive members for crossover and are arranged at substantially regular intervals along a circumferential direction of a concentric circle R1. Two conductive members 110n and 110n arranged at the outer side of the conductive members 110a to 110f are conductive members for neutral points and are arranged along a circumferential direction of a concentric circle R2. The conductive members 110u and 110v arranged at the outer side of the conductive members 110n and 110n are conductive members for a U-phase and a V-phase, respectively, and are arranged substantially along a circumferential direction of a concentric circle R3. The conductive member 110w arranged at the outermost side is a conductive member for a W-phase and is arranged to extend along a circumferential direction of a concentric circle R4. In the following description, if appropriate, the respective conductive members set forth above will be referred to as "crossover conductive members 110a to 110f", "neutral point conductive member 110n", "U-phase conductive member 110u", "V-phase conductive member 110v" and "W-phase conductive member 110w". When the respective conductive members are not distinguished from one another, they will be generally referred to as just as "conductive members 110".

The U-phase conductive member 110u is mostly arranged along the concentric circle R3 and is partially arranged along the concentric circle R4. In other words, the U-phase conductive member 110u includes an inner circumferential portion 110ui extending along the concentric circle R3, an outer circumferential portion 110uo extending along the concentric circle R4 and a straight portion 110uc extending rectilinearly along a direction of a tangential line X of the inner circumferential portion 110ui. The straight portion 110uc is integrally provided between two concentrically-arranged arc-shaped circumferential portions differing in curvature radius from each other, i.e., the inner circumferential portion 110ui and the outer circumferential portion 110uo.

Similarly, the V-phase conductive member 110v is mostly arranged along the concentric circle R3 and is partially arranged along the concentric circle R2. In other words, the V-phase conductive member 110v includes an inner circumferential portion 110vi extending along the concentric circle R2, an outer circumferential portion 110vo extending along the concentric circle R3 and a straight portion 110vc extending rectilinearly along a direction of a tangential line Y of the inner circumferential portion 110vi. The straight portion 110vc is integrally provided between two concentrically-arranged arc-shaped circumferential portions differing in curvature radius from each other, i.e., the inner circumferential portion 110vi and the outer circumferential portion 110vo.

Figure 4:
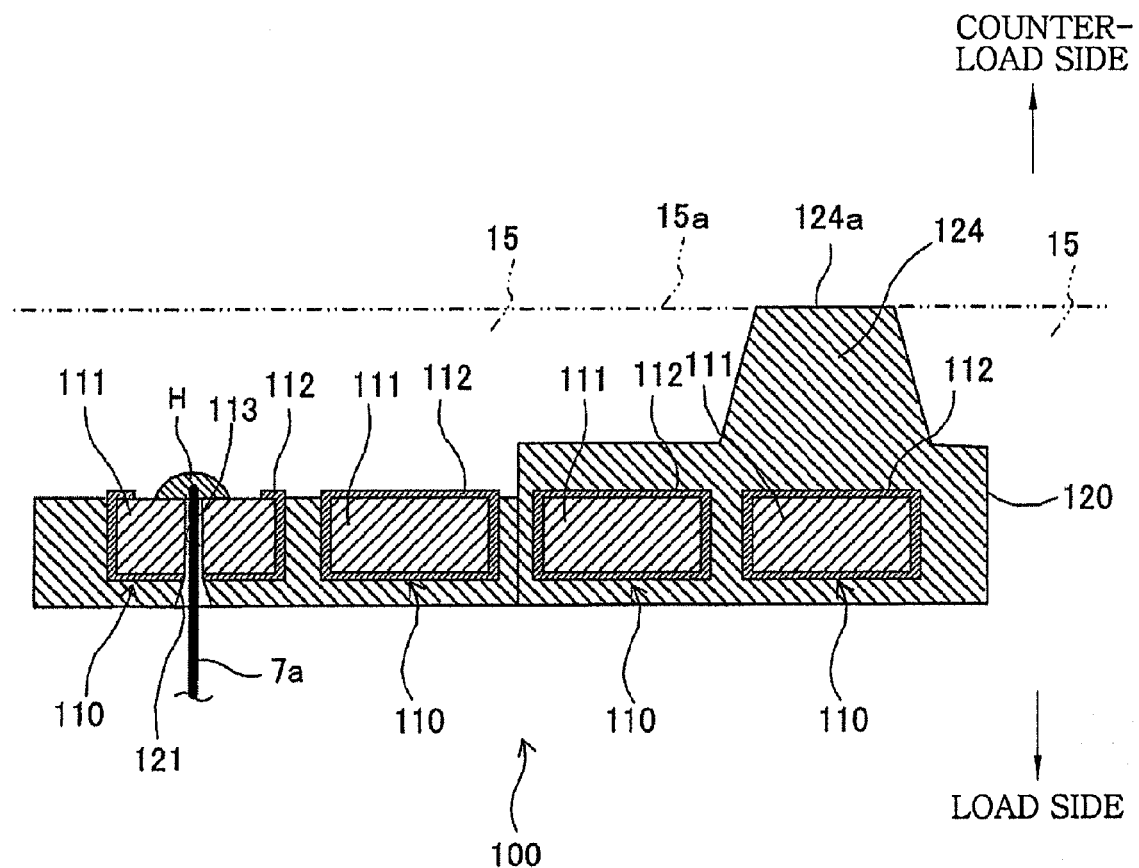
FIG. 4 is a section view of the wire connection substrate taken along line IV-IV in FIG. 3.

In the present embodiment, as shown in FIG. 4, each of the conductive members 110 has a substantially rectangular cross-sectional shape and includes a conductor 111 and a sheath 112 covering the conductor 111. As shown in FIG. 4 (see a solder H shown in FIG. 3 and described later), through-holes 113 are formed in the substantially transverse center positions of the longitudinal opposite end portions of the conductive members 110 to allow the coil end portions 7a to axially extend through the through-holes 113. The coil end portions 7a inserted into the through-holes 113 are fixed to the counter-load-side surfaces of the conductive members 110 by solders H (corresponding to soldering portions). In other words, the sheath 112 existing around the through-holes 113 of the conductive members 110 is peeled off. The solders H are provided in the peeled-off regions.

(Insulating Member)

The insulating member 120 is an annular member formed by insert-molding, e.g., a resin material. The insulating member 120 serves to secure insulation between the respective conductive members 110 while fixing the respective conductive members 110 in specified positions so that the respective conductive members 110 can be placed on the same plane substantially perpendicular to the axial direction.

Figure 5:
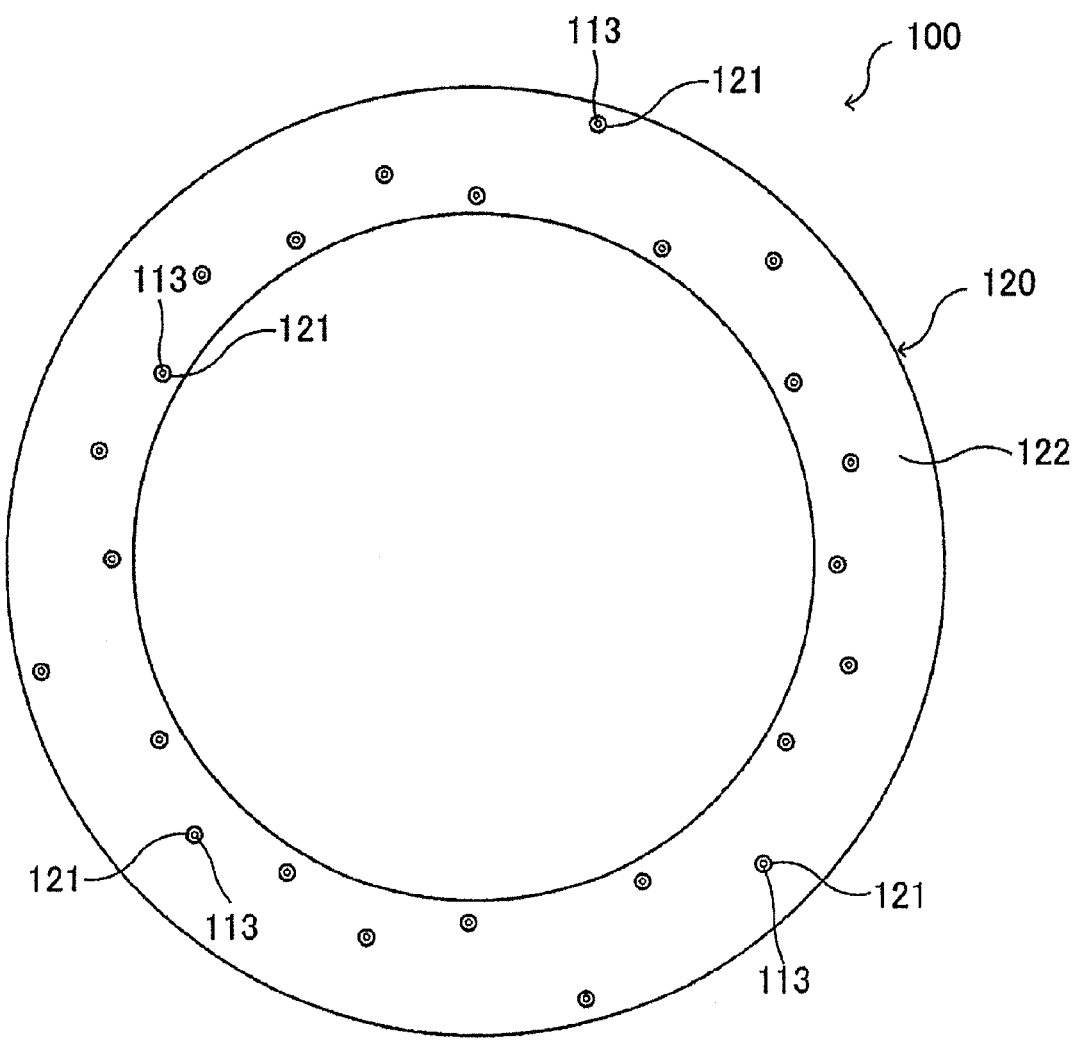
FIG. 5 is a plan view showing the overall configuration of the wire connection substrate provided in the rotary electric machine shown in FIG. 1, in which the wire connection substrate is seen from the load side.

As shown in FIGS. 4 and 5, the insulating member 120 has taper holes 121 formed in alignment with the through-holes 113 of the conductive members 110. The taper holes 121 are formed on the load side surface 122 of the insulating member 120. Each of the taper holes 121 is formed such that, the diameter thereof becomes gradually smaller from the surface 122 toward each of the through-holes 113 of the conductive members 110. The coil end portions 7a of the stator 2 are inserted from the side of the stator 2, through the taper holes 121, and into the through-holes 113 of the conductive members 110.

(Projection Portion)

As one feature of the present embodiment, the insulating member 120 includes resin-fixing projection portions 124 protruding toward the resin molded part 15 existing at one axial end side (the counter load side). As shown in FIGS. 2 through 4, the projection portions 124 are formed at multiple points (at six points in the present embodiment) along a circumferential direction. At least one of the projection portions 124 (a pair of diametrically opposite projection portions 124 in the present embodiment) includes a binding portion 125 one-piece formed with each of the projection portions 124. The binding portion 125 radially extends from the inner peripheral side of the insulating member 120 to the outer peripheral side thereof so as to bind the conductive members 110 arranged side by side along a radial direction. In other words, the insulating member 120 covers the counter-load side surfaces of the conductive members 110 in the regions corresponding to the projection portions 124 and the binding portions 125 but keeps the counter-load side surfaces of the conductive members 110 exposed in the regions other than the projection portions 124 and the binding portions 125. While not shown in FIGS. 2, 3 and 4, the projection portions 124 are actually covered with the resin molded part 15 shown in FIG. 1 except for the end surfaces 124a to be described later (see FIG. 4). As shown in FIGS. 2 and 4, the respective conductive members 110 are actually arranged to have a specified radial gap defined by the insulating member 120. For the sake of simplicity, the gap is not shown in FIG. 3.

Each of the projection portions has a substantially conical shape with a planar surface existing in the apex portion thereof such that each of the projection portions 124 has a substantially isosceles trapezoidal shape when seen in a side view (see FIG. 4). As set forth earlier, the projection portions 124 are mostly covered with the resin molded part 15. However, the planar surfaces formed in the apex portions of the projection portions 124, namely the counter-load side end surfaces 124a, are not covered with the resin molded part 15 and are exposed from the counter-load side end surface 15a (see FIG. 4) of the resin molded part 15. As depicted in FIG. 3, an identification mark (letter "F1" in the present embodiment) is applied to the end surface 124a of at least one of the projection portions 124 (the projection portion 124 having the binding portion 125 in the present embodiment) (which corresponds to an identification mark portion). The identification mark may be used to indicate, e.g., at least one of the wire connection type of the wire connection substrate 100 (the details of which will be described later), the kind of the rotary electric machine 1, the production lot and the kind of the mold used in the manufacturing process (the details of which will be described later).

(Wire Connection Pattern)

Figure 6:
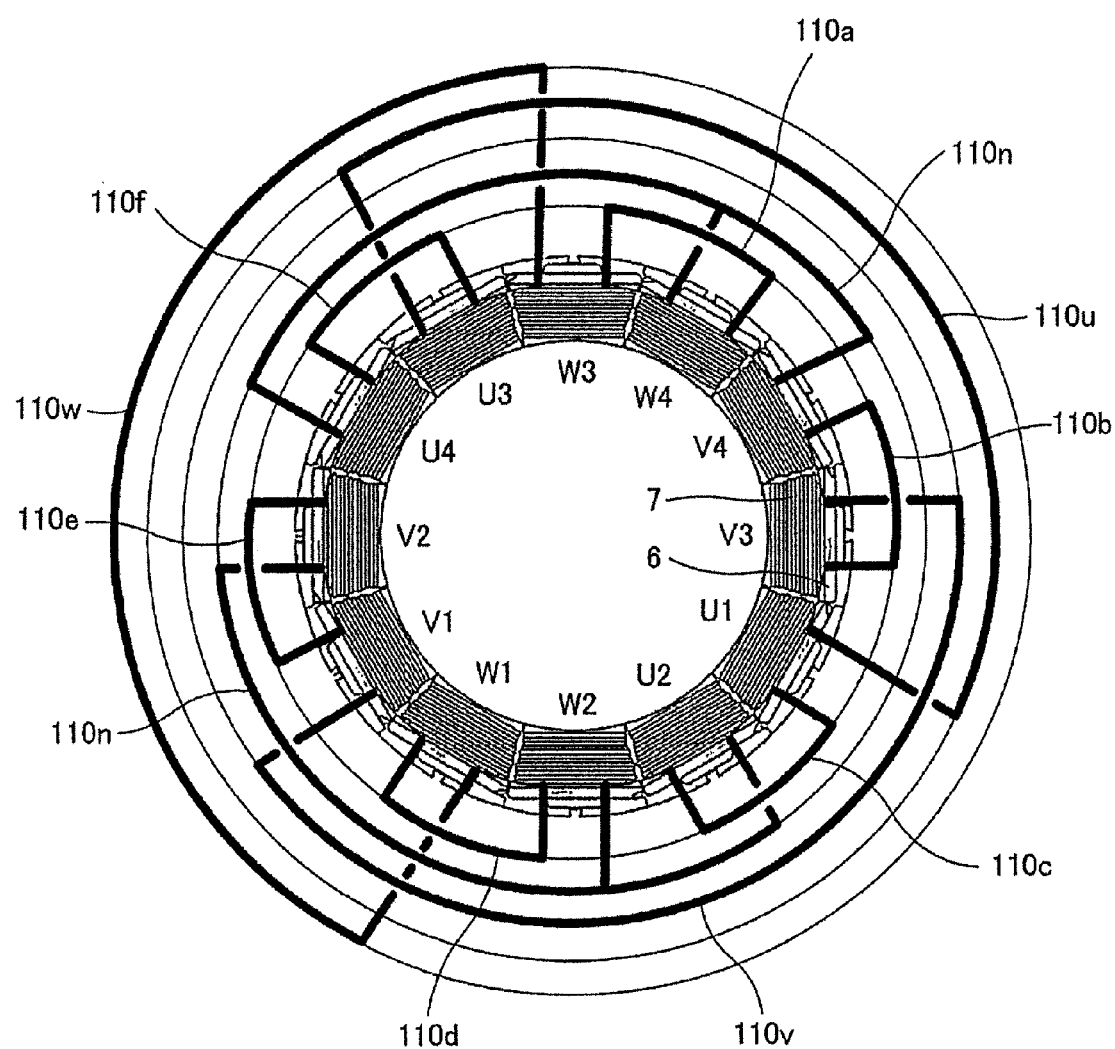
FIG. 6 is an explanatory view illustrating a wire connection pattern in the wire connection substrate.
Figure 7:
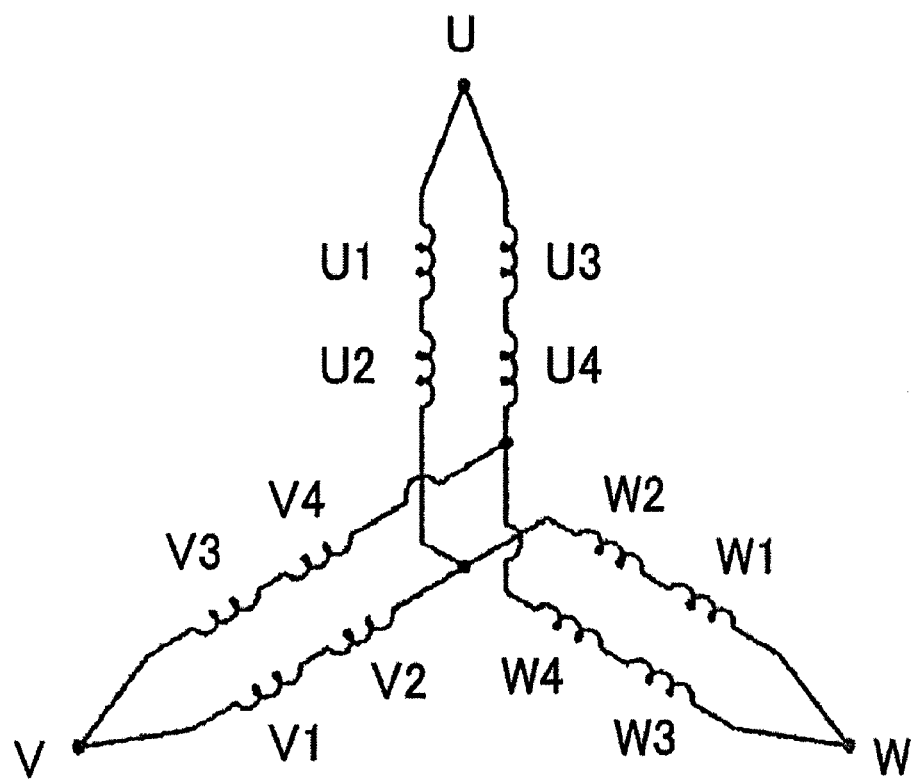
FIG. 7 is a wire connection diagram of the rotary electric machine according to one embodiment.

Next, the wire connection pattern in the wire connection substrate 100 will be described with reference to FIGS. 6 and 7. Reference symbols of the respective coils shown in FIGS. 6 and 7 are in a corresponding relationship with the respective coils. In the description made herein, for instance, the stator coil 7 corresponding to U1 will be called "coil U1".

As shown in FIGS. 6 and 7, the wire connection substrate 100 connects the coil end portions 7a of the stator 2 in a wire connection pattern having two star connection systems in which the three-phase coils are connected at neutral points existing at one ends of the three-phase coils. More specifically, one end portions 7a of the coils U1 and U2 making up one U-phase system are connected to each other by the crossover conductive member 110c. One end portions 7a of the coils U3 and U4 making up the other U-phase system are connected to each other by the crossover conductive member 110f. Similarly, one end portions 7a of the coils V1 and V2 making up one V-phase system are connected to each other by the crossover conductive member 110e. One end portions 7a of the coils V3 and V4 making up the other V-phase system are connected to each other by the crossover conductive member 110b. Likewise, one end portions 7a of the coils W1 and W2 making up one W-phase system are connected to each other by the crossover conductive member 110d. One end portions 7a of the coils W3 and W4 making up the other W-phase system are connected to each other by the crossover conductive member 110a.

The other end portions 7a of the coils U2, V2 and W2 are connected to one another by the neutral point conductive member 110n. Similarly, the other end portions 7a of the coils U4, V4 and W4 are connected to one another by the neutral point conductive member 110n. Moreover, the other end portion 7a of the coil U1 and the other end portion 7a of the coil U3 are connected to the U phase through the U-phase conductive member 110u. The other end portion 7a of the coil V1 and the other end portion 7a of the coil V3 are connected to the V phase through the V-phase conductive member 110v. The other end portion 7a of the coil W1 and the other end portion 7a of the coil W3 are connected to the W phase through the W-phase conductive member 110w.

Next, description will be made on a manufacturing sequence of the rotary electric machine 1.

(Manufacture of Wire Connection Substrate)

First, a single coated flat wire is formed into a spiral shape. Then, the coated flat wire having a spiral shape is fixed to a mold and is insert-molded with a resin material as an insulating material. The coated flat wire is covered with the insulating material in the projection portions 124 and the binding portions 125. In other portions, at least one surface (the counter-load-side surface) of the coated flat wire is exposed. As a consequence, there is formed a non-severed insulating member 120 covering the spiral coated flat wire.

Next, the coated flat wire covered with the insulating member 120 is severed in specified circumferential positions by a pressing work using a punch press in the present embodiment. At the same time, by virtue of the pressing work using the punch press, the through-holes 113 are formed at the substantially transverse centers of the longitudinal opposite end portions of individual conductive members 110 to allow the coil end portions 7a to axially extend through the through-holes 113.

Thus, the coated flat wire and the insulating member 120 are partially removed, thereby forming individual conductive members 110 such that the coil end portions 7a can be connected to the longitudinal opposite end portions of the conductive members 110. At this time, it is preferred that the coated flat wire be severed to such an extent as to secure insulation between the respective conductive members 110. There is no need to limit the shape and length of the removal portions. For example, the removal portions may be formed into a simple circular hole shape or a rectangular hole shape so as to have a short length. The coated flat wire may be severed through the use of a tool other than the punch press, e.g., a drill.

The sheath 112 existing around the through-holes 113 of the respective conductive members 110 are peeled off by a sandpaper or a knife. Through the use of a drill or the like, taper holes 121 are formed on the counter-wire-connection-side surface 122 of the insulating member 120 in alignment with the through-holes 113. A wire connection substrate 100 is finally produced through the steps described above.

(Connection of Wire Connection Substrate and Stator Coil)

Next, two coil end portions 7a corresponding to a winding start portion and a winding end portion of each of the stator coils 7 of the bobbins 6 attached to the stator 2 are led out to the counter-load side along the direction of axis k. Then, the respective coil end portions 7a thus led out are inserted into the through-holes 113 of the corresponding conductive members 110 through the taper holes 121. Thereafter, the wire connection substrate 100 is fixed to the bobbins 6 of the stator 2. Unnecessary portions of the coil end portions 7a are cut such that the coil end portions 7a have such a length as to slightly protrude beyond the wire-connection-side surfaces of the respective conductive members 110. By performing a soldering work, the coil end portions 7a are fixed to the respective conductive members 110 with solders H. In this manner, the connection of the wire connection substrate 100 and the stator coils 7 of the stator 2 comes to an end, eventually providing an assembly 20 of the wire connection substrate 100 and the stator 2 (see FIG. 2 and FIG. 8 to be described later).

(Formation of Stator Unit by Resin Molding)

Figure 8:
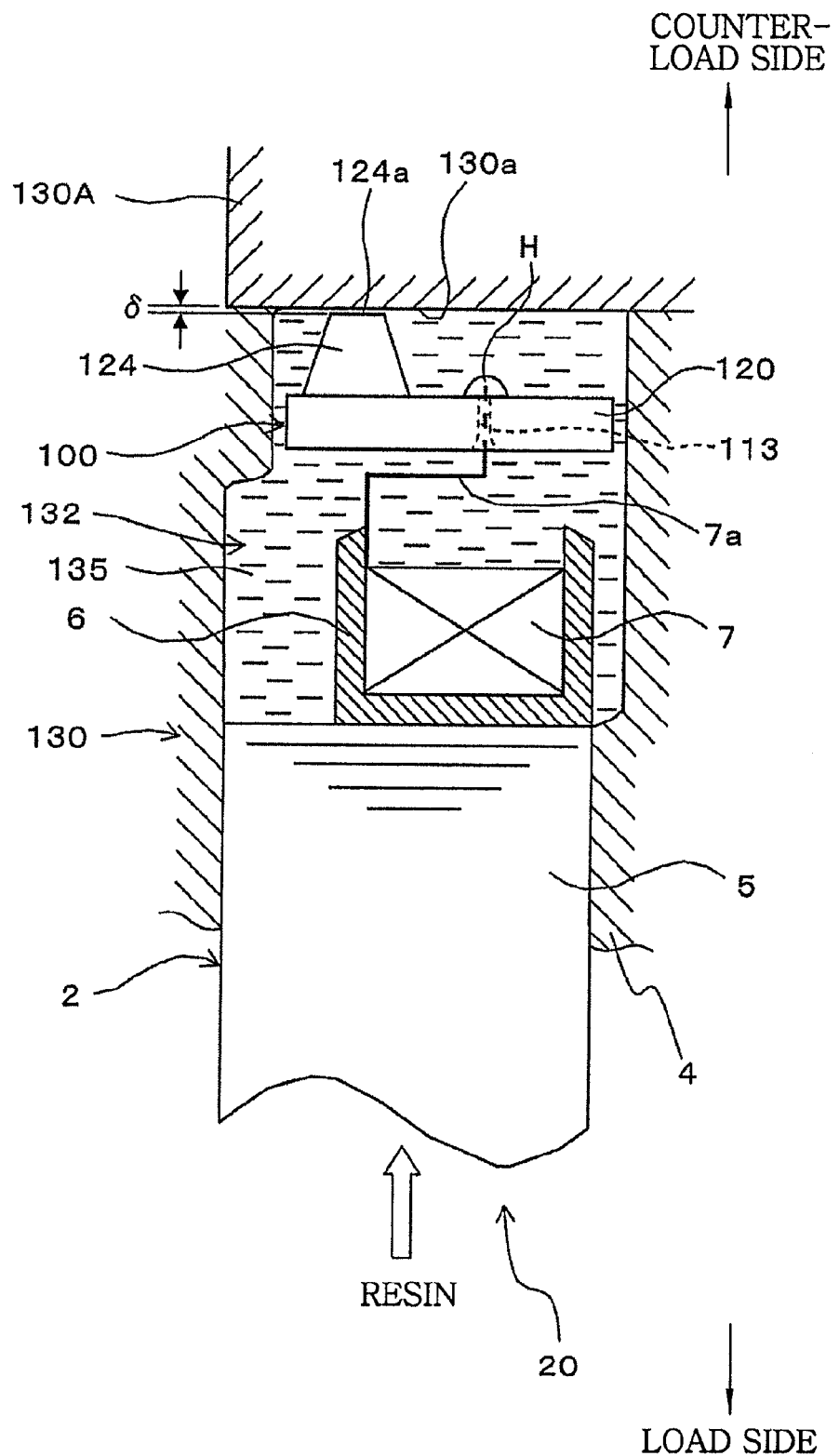
FIG. 8 is an explanatory view illustrating how to integrally cover the stator coils and the wire connection substrate with a resin.

Thereafter, as shown in FIG. 8, the assembly 20 is arranged, e.g., in a state that the counter-load side (namely, the side of the wire connection substrate 100) thereof is positioned upward and the load side thereof is positioned downward. In this state, a mold 130 having, e.g., a substantially cylindrical shape, is installed at the radial inner side of twelve laminated core bodies 5 arranged in a substantially annular pattern (so that the radial outer portion of the mold 130 can make contact with the laminated core bodies 5). An upper mold cover 130A is installed above the mold 130 and the frame 4 of the stator 2. Consequently, a cavity 132 is formed inside the mold 130, the upper mold cover 130A and the frame 4.

At this time, the projection portions 124 provided in the insulating member 120 of the wire connection substrate 100 are positioned such that a minute gap δ (e.g., δ=0.5 mm) exists between the end surfaces 124a of the projection portions 124 and the wall surface 130a of the upper mold cover 130A. Thereafter, a molding resin 135 is supplied toward the counter-load side (upward in FIG. 8) to flow into the cavity 132 surrounded by the mold 130, the upper mold cover 130A and the frame 4. At this time, it is sometimes the case that the insulating member 120 is lifted up by the resin 135 filled from the lower side. The end surfaces 124a of the projection portions 124 of the insulating member 120 thus lifted up make contact with the wall surface 130a of the upper mold cover 130A positioned above the insulating member 120. Thus, the insulating member 120 is prevented from being further lifted up. The displacement corresponding to the minute gap 5 is absorbed by the deformation of the stator coils 7 which act as elastic bodies.

Upon supplying the resin 135 into the cavity 132 in this manner, the resin 135 is filled around the wire connection substrate 100 and the stator coils 7. As the resin 135 is solidified, there is formed a resin molded part 15 (see FIG. 1). As a result, the wire connection substrate 100 and the stator coils 7 are integrally covered with the resin molded part 15 in a state that the end surfaces 124a of the projection portions 124 of the wire connection substrate 100 are kept exposed. A stator unit is constituted by the assembly 20 covered with the resin molded part 15 in this manner (the stator 2, the wire connection substrate 100 and the resin molded part 15).

Some of the aforementioned steps (e.g., the step of connecting the stator coils to the wire connection substrate and the step of forming the stator unit by resin molding) can be automated through the use of, e.g., a robot.

(Completion of Rotary Electric Machine)

Thereafter, the load-side bracket 11 and the counter-load-side bracket 13 are attached to the stator unit. Then, the rotating shaft 10 carrying the rotor 3 is supported on the load-side bearing 12 provided in the load-side bracket and the counter-load-side bearing 14 provided in the counter-load-side bracket 13, thereby completing the rotary electric machine 1.

(Effects of the Embodiment)

As described above, when manufacturing the rotary electric machine 1 of the present embodiment, the molding resin 135 is supplied into the cavity 132 in which the assembly 20 of the wire connection substrate 100 and the stator coils 7 is installed. The resin 135 is filled around the wire connection substrate 100 and the stator coils 7, thus forming the resin molded part 15. The resin 135 is also filled around the conductive members 110 and the insulating member 120, eventually forming the resin molded part 15. In the present embodiment, the insulating member 120 of the wire connection substrate 100 is provided with at least one resin-fixing projection portion 124. Since the projection portion 124 protrudes toward the counter-load-side resin molded part 15, the insulating member 120 protrudes toward the counter-load side farther than other portions. In other words, the insulating member 120 is formed into a concavo-convex shape in the direction of axis k by the projection portion 124 and other portions. Therefore, as compared with a case where the insulating member 120 has a flat shape with no concavity and convexity, the contact area between the insulating member 120 and the surrounding resin molded part 15 becomes larger. As a result, the coupling degree (so-called adherence) of the resin molded part 15 and the insulating member 120 is enhanced. This makes it possible to enhance reliability when the resin molded part 15 encapsulates the wire connection substrate 100 after solidification of the resin 135.

In the present embodiment, the end surfaces 124a of the projection portions 124 are exposed from the end surface 15a of the resin molded part 15. The exposed end surfaces 124a serve as identification mark portions indicating at least one of the wire connection type of the wire connection substrate 100, the kind of the rotary electric machine 1, the production lot and the kind of the mold used in the manufacturing process. This has the following meaning.

In case that the wire connection substrate 100 and the stator coils 7 are covered with the resin molded part 15, it is impossible, after the end of molding, to externally see and confirm the wire connection substrate 100 and the stator coils 7 encapsulated inside the resin molded part 15. As a result, if the aforementioned resin molding structure is commonly employed in different kinds of rotary electric machines 1, it may be impossible to externally identify the kinds of the rotary electric machines 1.

In the present embodiment, the projection portions 124 of the insulating member 120 are exposed from the end surface 15a of the resin molded part 15. For instance, the kinds of the rotary electric machines 1 are marked in the identification mark portions provided in the end surfaces 124a of the projection portions 124. Accordingly, unlike the aforementioned case, it is possible to identify the different kinds of the rotary electric machines 1 even after the end of molding, thereby improving the convenience. Even when the wire connection type of the wire connection substrate 100, the production lot or the kind of the mold used in the manufacturing process is marked in the end surfaces 124a of the projection portions 124 in the aforementioned manner, it is possible to enhance the identification ability and to increase the convenience.

In the present embodiment, each of the projection portions 124 has a substantially conical shape with a planar end surface 124a existing in the apex thereof such that each of the projection portions 124 has a substantially isosceles trapezoidal shape when seen in a side view. In a hypothetical case where each of the projection portions 124 is formed into, e.g., a cylindrical shape, if an external force is applied in such a direction as to move the projection portions 124 away from the resin molded part 15 (namely, in the axial direction of the cylindrical projection portions 124), the function of maintaining the coupling with the resin molded part 15 against the external force becomes very poor. In the present embodiment, however, each of the projection portions 124 has a substantially conical shape. This makes it possible to increase the contact area and to enhance the function of maintaining the coupling with the resin molded part 15.

In the manufacturing process of the rotary electric machine 1, if the wire connection substrate 100 is independently handled prior to forming the resin molded part in the aforementioned manner, it may sometimes be the case that the projection portions 124 protruding farther than other portions interfere with a surrounding object. For example, if the projection portions 124 are formed into a cylindrical shape, stresses are concentrated on the root regions of the projection portions 124 where interference occurs. It is therefore likely that the projection portions 124 are broken or damaged. In the present embodiment, each of the projection portions 124 has a substantially conical shape as set forth above. Thus, stresses are distributed along the slant surface of each of the substantially conical projection portions 124. This makes it possible to avoid the concentration of stresses. As a result, it is possible to increase the structural integrity of the projection portions 124.

In the case where some of the manufacturing steps are automated through the use of a robot as mentioned earlier, there may be a case that the wire connection substrate 100 is transferred or moved with the projection portions 124 gripped with, e.g., robot hands. In this case, if the projection portions 124 are formed into a cylindrical shape, the positioning of the robot hands with respect to the projection portions 124 need to be quite accurately performed when the robot hands grip the projection portions 124. In the present embodiment, however, the projection portions 124 are formed into a conical shape having a slant surface. Therefore, even if the positioning is performed with some errors, it is possible for the robot hands to reliably grip the projection portions 124. This enhances the ease of handling of the wire connection substrate 100.

As stated above, the wire connection substrate 100 is installed such that the counter-load side thereof faces upward. During the supply of the resin 135, the insulating member 120 is lifted up by the resin 135 filled from the lower side. In the present embodiment, when the insulating member 120 is lifted up, the projection portions 124 first make contact with the wall surface 130a of the upper mold cover 130A. Thus, the insulating member 120 is prevented from being further lifted up. Since the end surfaces 124a of the projection portions 124 are planar surfaces, the lifting pressure can be evenly received by the planar end surfaces 124a. This makes it possible to reliably prevent the insulating member 120 from being lifted up.

In the present embodiment, the projection portions 124 are arranged in at least two diametrically opposite positions of the insulating member 120. Therefore, when the projection portions 124 are gripped to handle the wire connection substrate 100 in the manufacturing process, it is possible to stably grip the two projection portions 124 in a well-balanced manner, thereby enhancing the reliability. This is particularly effective when the robot hands grip the projection portions 124 by a suction force. In addition, when carrying out the aforementioned handling or different processing works (e.g., the aforementioned pressing work), it is possible to easily find a positioning datum point using the projection portions 124 formed in two diametrically opposite positions.

In the present embodiment, the binding portion 125 extending in the radial direction is provided so as to bind the conductive members 110 arranged side by side along the radial direction. Accordingly, it is possible to strongly interconnect the conductive members 110 and to enhance the rigidity of the conductive members 110.

In the present embodiment, at least one projection portion 124 is arranged in the binding portion 125. Accordingly, when the wire connection substrate 100 is transferred or moved by robot hands or the like in the manufacturing process, it is possible to stably and reliably transfer the wire connection substrate 100 by gripping the projection portion 124 having high rigidity.

In the present embodiment, the coil end portions 7a of the stator coils 7 extending through the through-holes 113 are fixed to the surfaces of the conductive members 110 with solders H. In other words, the coil end portions 7a of the stator coils 7 are axially extended through the through-holes 113 of the conductive members 110 and are connected to the conductive members 110 by the solders H on the counter-load side surfaces of the conductive members 110. As a result, there is no need to additionally provide terminal members or to arrange the conductive members 110 in an axially deviated state on a phase-by-phase basis as is the case in the conventional case. It is therefore possible to reduce the axial dimension of the wire connection substrate 100. As a consequence, it is possible to reduce the size of the rotary electric machine 1.

In case of employing the structure in which the coil end portions 7a are fixed by the solders H, if the insulating member 120 is lifted up due to the supply of the resin 135 in the aforementioned resin molding process, there is likelihood that the lifting force acts on the solders H, consequently reducing the durability of the solders H. In the present embodiment, the projection portions 124 first make contact with the wall surface 130a of the upper mold cover 130A as mentioned above, thereby preventing the insulating member 120 from being further lifted up. It is therefore possible to prevent reduction of the durability of the solders H and to reliably and satisfactorily maintain the conductivity.

In the present embodiment, the conductive members 110 are formed by arranging, in multiple layers along the radial direction, the conductive wires severed in specified circumferential removal portions by a pressing work using a punch press. Accordingly, when severing the circumferential removal portions of the conductive wires to form the conductive members 110, it is possible to efficiently and rapidly perform the severing work as compared with a typical cutting work.

(Modified Embodiments)

The present invention is not limited to the embodiment described above but may be modified in many different forms without departing from the spirit and technical concept of the invention.

For example, while the wire connection pattern having two star connection systems has been described by way of example in the foregoing embodiment, the present invention is not limited thereto. The present invention may be applied to different connection patterns such as Δ connection and V connection by appropriately changing the winding number, the severing position and the connection position of the coated flat wire.

While the three-phase AC motor having twelve stator coils 7 has been described above as one example of the rotary electric machine 1, the number of the stator coils 7 may be appropriately changed. The present invention can be applied to a motor other than the three-phase AC motor, e.g., a single-phase AC motor or a DC motor. In other words, the motor is not limited to a specific type. The present invention can be applied to different motors as long as the coil end portions 7a of the stator coils 7 can be connected in a specified connection pattern.

While the coated flat wire having the sheath 112 is used to form the conductive members 110, it may be possible to use a flat wire having no sheath 112. Moreover, the conductive members 110 need not be necessarily formed of a flat wire but may be formed of a wire having a cross-sectional shape other than a rectangular shape (e.g., a round wire).

While the inner-rotor-type rotary electric machine having the rotor 3 arranged inside the stator 2 has been described above as one example of the rotary electric machine 1, the present invention may be applied to an outer-rotor-type rotary electric machine having a rotor arranged outside a stator. While the motor has been described as one example of the rotary electric machine 1, the rotary electric machine 1 may be a generator.

While the projection portions 124 substantially identical in shape and height with one another have been described above by way of example, it may be possible to provide, in addition to the projection portions 124, projection portions differing in shape and height from the projection portions 124. For example, it may be possible to additionally provide two projection portions thinner and higher than the projection portions 124. The projection portions thus provided have the same functions as those of the projection portions 124 and may also serve to keep lead wires in a specified position.

When removing the stator unit from the mold, it may be possible to bring mold-detaching ejector pins into contact with the end surfaces 124a of the projection portions 124. This makes it possible to prevent the sheath 112 from being damaged by the ejector pins otherwise making contact with the coated flat wire (which makes it possible to secure the insulation quality of the wire connection substrate). Furthermore, the stator unit can be stably detached from the mold by pressing the end surfaces 124a with the ejector pins. In addition, it is possible to restrain the wire connection substrate 100 from being deformed (or cut) during the detachment of the stator unit from the mold.

In addition to the above, the embodiment and the respective modified embodiments may be appropriately combined.

While not specifically mentioned, the embodiment and the respective modified embodiments may be changed in many different forms without departing from the spirit thereof.

What is claimed is:

1. A stator unit, comprising:
    a stator provided with a plurality of stator coils;
    a wire connection part provided at one side of the stator coils in an axial direction, the wire connection part connecting end portions of the stator coils in a specified wire connection pattern; and
    a resin molded part arranged to cover the wire connection part and the stator coils,
    wherein the wire connection pan includes a plurality of conductive members connected to the end portions of the stator coils and an insulating member arranged to at least partially cover surfaces of the conductive members, the insulating member having projection portions protruding toward the resin molded part existing at the one axial side, and
    wherein the projection portions include at least two projection portions arranged in two diametrically opposite points of the insulating member.

2. A rotary electric machine, comprising:
    the stator unit of claim 1;
    a rotating shall having an axis extending in the axial direction; and
    a rotor fixed to the rotating shaft,
    wherein the stator is arranged radially opposite to the rotor.

3. The machine of claim 2, wherein each of the projection portions includes one axial end surface exposed from one axial end surface of the resin molded part and an identification mark portion provided on the exposed axial end surface to indicate at least one of a connection type of the wire connection part, a kind of the rotary electric machine, a production lot and a kind of a mold used in a manufacturing process.

4. The machine of claim 3, wherein each of the projection portions has a substantially conical shape with a flat apex surface serving as the exposed axial end surface such that the projection portion has a substantially isosceles trapezoidal shape when seen in a side view.

5. The machine of claim 4, wherein the conductive members are arranged in a concentric pattern and are respectively formed into an annular shape or an arc shape, the insulating member having a substantially annular shape, the insulating member including a binding portion radially extending so as to bind the conductive members arranged side by side along a radial direction.

6. The machine of claim 5, wherein the projection portions include at least one projection portion formed in the binding portion.

7. The machine of claim 4, wherein the insulating member has a substantially annular shape, the conductive members arranged in a concentric pattern and formed into an annular shape or an arc shape, each of the conductive members having a through-hole through which each of the end portions of the stator coils is axially extended from the other axial side to the one axial side, each of the end portions of the stator coils fixed to a surface of each of the conductive members on the one axial side by a soldering portion.

8. The machine of claim 7, wherein the conductive members are formed by arranging, in multiple layers along a radial direction, conductive wires severed in a plurality of specified circumferential removal portions by a pressing work using a punch press.

9. The machine of claim 3, wherein the conductive members are arranged in a concentric pattern and are respectively formed into an annular shape or an arc shape, the insulating member having a substantially annular shape, the insulating member including a binding portion radially extending so as to bind, the conductive members arranged side by side along a radial direction.

10. The machine of claim 9, wherein the projection portions include at least one projection portion formed in the binding portion.

11. The machine of claim 3, wherein the insulating member has a substantially annular shape, the conductive members arranged in a concentric pattern and formed into an annular shape or an arc shape, each of the conductive members having a through-hole through which each of the end portions of the stator coils is axially extended from the other axial side to the one axial side, each of the end portions of the stator coils fixed to a surface of each of the conductive members on the one axial side by a soldering portion.

12. The machine of claim 11, wherein the conductive members are formed by arranging, in multiple layers along a radial direction, conductive wires severed in a plurality of specified circumferential removal portions by a pressing work using, a punch press.

13. The machine of claim 2, wherein the conductive members are arranged in a concentric pattern and are respectively formed into an annular shape or an arc shape, the insulating member having a substantially annular shape, the insulating member including a binding portion radially extending so as to bind the conductive members arranged side by side along a radial direction.

14. The machine of claim 13, wherein the projection portions include at least one projection portion formed in the binding portion.

15. The machine of claim 2, wherein the insulating member has a substantially annular shape, the conductive members arranged in a concentric pattern and formed into an annular shape or an arc shape, each of the conductive members having a through-hole through which each of the end portions of the stator coils is axially extended from the other axial side to the one axial side, each of the end portions of the stator coils fixed to a surface of each of the conductive members on the one axial side by a soldering portion.

16. The machine of claim 15, wherein the conductive members are formed by arranging, in multiple layers along a radial direction, conductive wires severed in a plurality of specified circumferential removal portions by a pressing work using a punch press.

17. A wire connection substrate for connecting the end portions of stator coils of the stator unit of claim 1, comprising:
    the conductive members connected to the end portions of the stator coils; and
    the insulating member arranged, to at least partially cover the surfaces of the conductive members,
    wherein the insulating member is provided with a resin-fixing projection portion.

* * * * *